(12) United States Patent
Houlihan et al.

(10) Patent No.: US 6,700,708 B2
(45) Date of Patent: Mar. 2, 2004

(54) MICRO-LENS ARRAY AND METHOD OF MAKING MICRO-LENS ARRAY

(75) Inventors: Francis M. Houlihan, Millington, NJ (US); Madanagopal V. Kunnavakkam, Ithaca, NY (US); James A. Liddle, Walnut Creek, CA (US); Omkaram Nalamasu, Bridgewater, NJ (US)

(73) Assignees: Agere Systems, Inc., Allentown, PA (US); Triquint Technology Holding Co., Hillsboro, OR (US)

(*) Notice: Subject to any disclaimer, the term of this patent is extended or adjusted under 35 U.S.C. 154(b) by 0 days.

(21) Appl. No.: 10/157,015

(22) Filed: May 30, 2002

(65) Prior Publication Data

US 2003/0227688 A1 Dec. 11, 2003

(51) Int. Cl.$^7$ ............................................ G02B 27/10
(52) U.S. Cl. ..................................................... 359/618
(58) Field of Search ............................... 359/619, 620; 65/37; 264/1.34

(56) References Cited

U.S. PATENT DOCUMENTS

| | | | |
|---|---|---|---|
| 4,170,616 A | | 10/1979 | Jebens |
| 5,001,609 A | | 3/1991 | Gardner et al. |
| 5,254,390 A | * | 10/1993 | Lu ............................. 428/156 |
| 5,330,799 A | * | 7/1994 | Sandor et al. ............... 427/510 |
| 5,468,540 A | * | 11/1995 | Lu .............................. 428/156 |
| 5,554,432 A | * | 9/1996 | Sandor et al. ............... 428/157 |
| 5,601,758 A | | 2/1997 | Lee et al. |
| 5,670,096 A | * | 9/1997 | Lu .............................. 264/1.1 |
| 6,129,866 A | | 10/2000 | Hamanaka et al. |
| 6,220,703 B1 | | 4/2001 | Evans et al. |
| 6,229,782 B1 | | 5/2001 | Wang et al. |
| 6,282,034 B1 | | 8/2001 | Onishi et al. |
| 6,300,464 B2 | | 10/2001 | Morijiri et al. |
| 6,301,055 B1 | | 10/2001 | Legrand et al. |
| 6,348,999 B1 | * | 2/2002 | Summersgill et al. ...... 359/569 |

* cited by examiner

*Primary Examiner*—Ricky Mack
(74) *Attorney, Agent, or Firm*—Dickstein Shapiro Morin & Oshinsky, LLP

(57) ABSTRACT

A micro-lens array and a method for making are described. The micro-lens array includes a base element and a plurality of lenses formed of an epoxy and including nanoparticles. The micro-lens array is formed from a master micro-lens array, which is placed within a replica micro-lens making assembly. The master micro-lens array is coated with an anti-stiction material prior to having an elastomeric material positioned over it and cured. Removal of the elastomeric material provides a plurality of cavities, which are filled with an epoxy including nanoparticles. Curing of the epoxy finishes the fabrication of the micro-lens array. The lenses of the micro-lens array are formed from a colloidal suspension of nanoparticles and resin.

9 Claims, 4 Drawing Sheets

MICRO-LENS ARRAY AND METHOD OF MAKING MICRO-LENS ARRAY

FIELD OF THE INVENTION

The present invention is particularly related to a micro-lens array and a method for making the micro-lens array.

BACKGROUND

Numerous approaches have been utilized in the optical industry to make micro-lens arrays. Some conventional approaches have included an ink-jet process to deposit ultraviolet curable lens material on a base element, a hot embossing process to manufacture polycarbonate lenses, or a resist reflow process to pattern a spherical surface. Each of these conventional approaches has a disadvantage. For example, using an ink-jet process creates difficulty in tailoring the surface shape of the lens element. While spherical lenses may be easily formed through an ink-jet process, control of such a process is difficult for asymmetrically shaped lenses. Hot embossing causes significant material shrinkage after the embossing, which may lead to distorted reproduction. Using resist reflow is expensive and requires the use of clean room facilities.

Upon preparation of a master micro-lens array, replica lens arrays may be formed through molding techniques which are well known in the optical industry. See, for example, U.S. Pat. No. 6,300,464 (Morijiri et al.), U.S. Pat. No. 6,301,005 (Legrand et al.), and U.S. Pat. No. 6,129,866 (Hamanaka et al). Conventional replication approaches, however, have failed to address various issues necessary to be solved before the formed replicas can be used in a commercial product. Some important issues include control of distortion of the mold, material loss, environmental stability, and refractive index tailoring of the optical elements.

There exists a need for a low cost micro-lens array which addresses one or more of the disadvantages found in conventional approaches.

SUMMARY

The invention provides a micro-lens array that includes a base element and a plurality of micro-lenses formed of a resin and including nanoparticles, wherein the micro-lenses have a hardness of greater than 70 on the D shore scale.

The invention further provides a method for forming replica micro-lens arrays from a master micro-lens array having a plurality of micro-lenses. The method includes the steps of applying an anti-stiction coating to a surface of the master micro-lens array and the micro-lenses, providing an elastomeric material over the surface of the master micro-lens array and the micro-lenses, curing the elastomeric material, removing the elastomeric material from the master micro-lens array, the elastomeric material having a plurality of cavities, filling the cavities with an epoxy, and curing the epoxy.

The invention further provides a replica micro-lens array assembly that includes a base element, a backing plate, and walls extending between the base element and the backing plate and encompassing a cavity, wherein a surface of the base element facing the cavity is coated with an anti-stiction material.

The invention also provides a method of preparing a resin containing nanoparticles. The method includes the steps of neutralizing nanoparticles, mixing the neutralized nanoparticles in isopropyl alcohol with a trialkoxysilane reagent to form a colloidal suspension of modified nanoparticles, removing excess trialkoxysilane reagent from the colloidal suspension of modified nanoparticles through dialysis, mixing the colloidal suspension of modified nanoparticles with a solvent, removing the isopropyl alcohol from the colloidal suspension of modified nanoparticles, and blending the colloidal suspension of modified nanoparticles with a photocurable resin.

The foregoing and other advantages and features of the invention will be more readily understood from the following detailed description of the invention, which is provided in connection with the accompanying drawings.

DETAILED DESCRIPTION OF PREFERRED EMBODIMENTS

Figure 1:
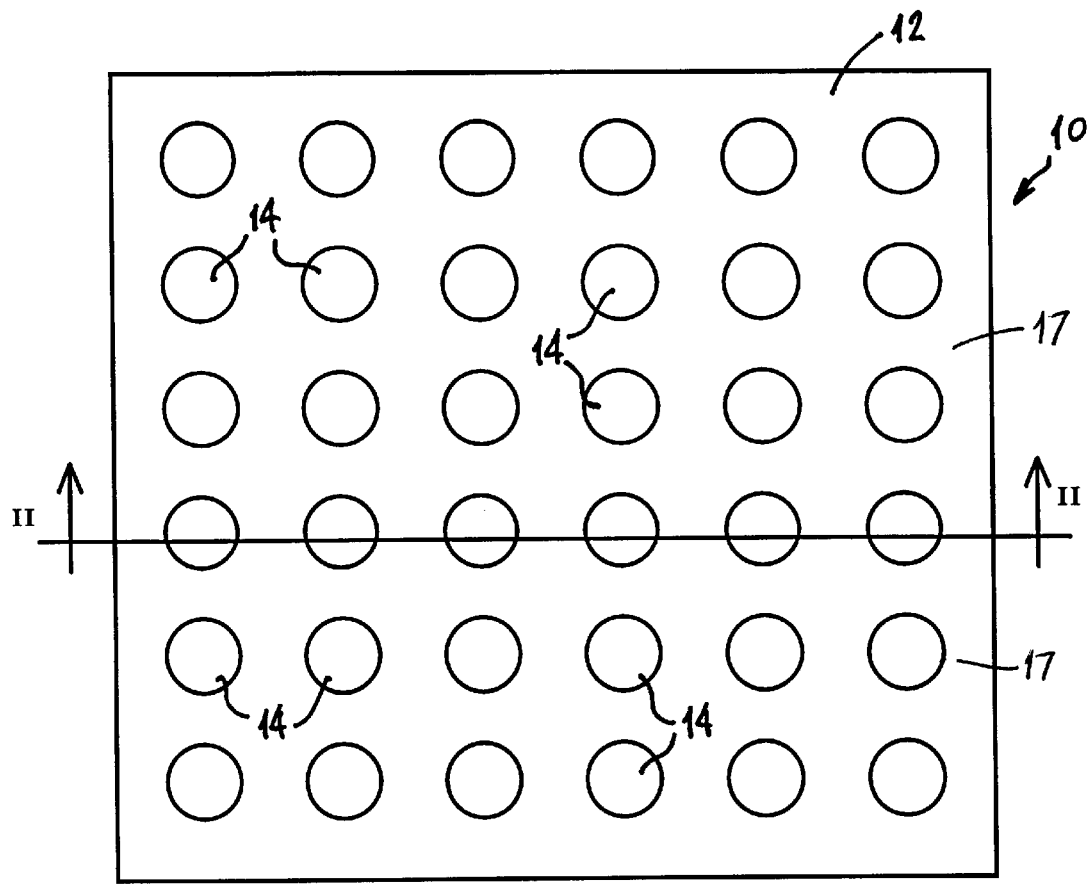
FIG. 1 is a top view of a master micro-lens array constructed in accordance with an embodiment of the invention.
Figure 2:
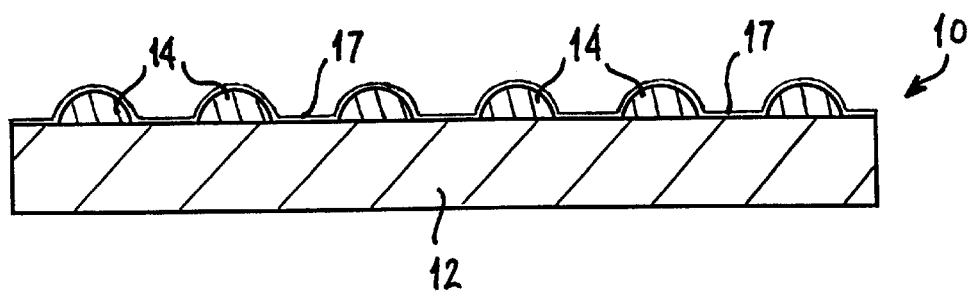
FIG. 2 is a cross-sectional view taken along line II—II of FIG. 1.

FIGS. 1–2 illustrate a master micro-lens array 10 constructed in accordance with an embodiment of the invention. The master micro-lens array is not described in detail. A master micro-lens array as described generally herein can be readily provided by one skilled in the art. The master micro-lens array 10 includes a plurality of micro-lenses 14 disposed on a surface of a substrate 12. Further, the surface of the substrate 12 and the lenses 14 are coated with an anti-stiction coating 17. The anti-stiction coating 17 comprises material which enables the release of the master micro-lens array 10 from a mold during formation of replica micro-lens arrays (to be described in detail below).

The anti-stiction coating 17 may include a class of chemicals known as organosilanes. Organosilanes have a general chemical formula of $R_n SiX_{(4-n)}$, where X is a hydrolyzable group such as a halogen, alkoxy, acyloxy or amine. Upon exposure to surface moisture on a lens array 10, the hydrolyzable group hydrolyzes and forms a siloxane (Si—O—Si) linkage with the lens array. The R group is an organic radical that includes the anti-stiction property.

One preferred organosilane which may be used as the anti-stiction coating 17 is (tridecafluoro-1,1,2,2-tetrahydrooctyl)-1-trichlorosilane, which has the chemical formula of $C_6F_{13}CH_2CH_2SiCl_3$. Throughout the remainder of the description, this organosilane shall be referred to as trichlorosilane for simplicity of discussion. Trichlorosilane, which is commercially available in liquid form from United Chemical Technologies, includes as an R group a fluorinated organic group ($C_6F_{13}CH_2CH_2$). The fluorinated organic group is inert and does not form any bonds with other surfaces.

One method of coating the anti-stiction coating 17 on the master micro-lens array 10 is by placing the micro-lens array in a dessicator along with a slide coated with the organosilane, such as, for example, the trichlorosilane. As the dessicator is pumped down, the trichlorosilane vaporizes and coats the surface of the micro-lens array 10. Through this method, the anti-stiction coating 17 generally is one molecular layer in thickness. Obviously, the anti-stiction coating 17 illustrated in FIG. 2 is magnified for illustrative purposes.

Figure 3:
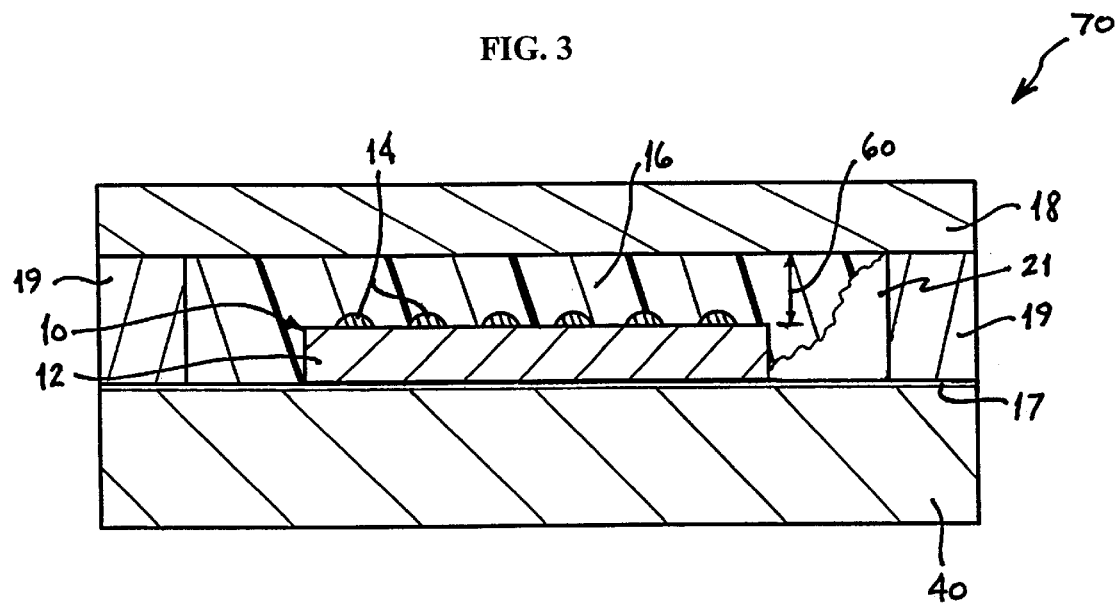
FIG. 3 is a cross-sectional view of a replica-making assembly constructed in accordance with an embodiment of the invention.

Next will be described, in reference to FIGS. 3–5, the formation of a mold 50 (FIG. 4) from the master micro-lens array 10. As specifically shown in FIG. 3, the micro-lens array 10 is placed in a replica-making assembly 70. The replica-making assembly 70 includes a backplate 18 and a base element 40 separated by a plurality of standoffs 19. This arrangement creates a cavity 21 in which the master micro-lens array 10 is placed. An anti-stiction coating 17 is applied to a surface of the base element 40. The base element 40 may be formed of a glass-like material. Again, as in FIG. 2, the anti-stiction coating 17 is magnified in FIG. 3 for illustrative purposes.

The backplate 18 should be formed of a rigid material that has a low coefficient of thermal expansion. One such material is quartz. No anti-stiction coating 17 is applied to the backplate 18. The standoffs 19 are spacers that may be formed of either glass or TEFLON®. Further, the standoffs 19 extend a height which is a distance 60 greater than the height of the substrate 12. For example, the distance 60 may be one millimeter. Distance 60 is much less than the width of the backplate 18. This ensures a very low distortion of lens shape. An elastomeric material 16 is introduced into the cavity 21 to fill in the excess space remaining in the cavity surrounding the master micro-lens array 10. The elastomeric material 16 is only partially shown in FIG. 3 for ease of illustration of the cavity 21. Since, for example, the standoffs 19 extend one millimeter beyond the substrate 12, the elastomeric material 16 is ensured of being at least one millimeter in thickness within the cavity 21. The elastomeric material 16 is preferably formed of a silicone based material, such as; for example, SYLGARD®, which is available from Dow Corning.

As will be described in greater detail below, the replica-making assembly 70 is chemically acted upon and heated to ensure that the backplate 18 and the elastomeric material 16 can be peeled from the master micro-lens array 10 after curing of the elastomeric material 16. After curing of the elastomeric material 16, the elastomeric material 16 and the backplate 18, which form the mold 50, are peeled from the master micro-lens array 10. The cured elastomeric material 16 now includes a plurality of cavities 20.

Figure 4:
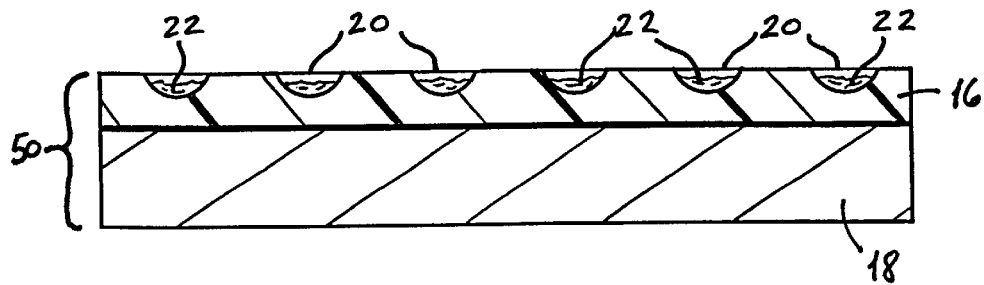
FIGS. 4–5 are cross-sectional views illustrating a mold constructed in accordance with an embodiment of the invention.
Figure 5:
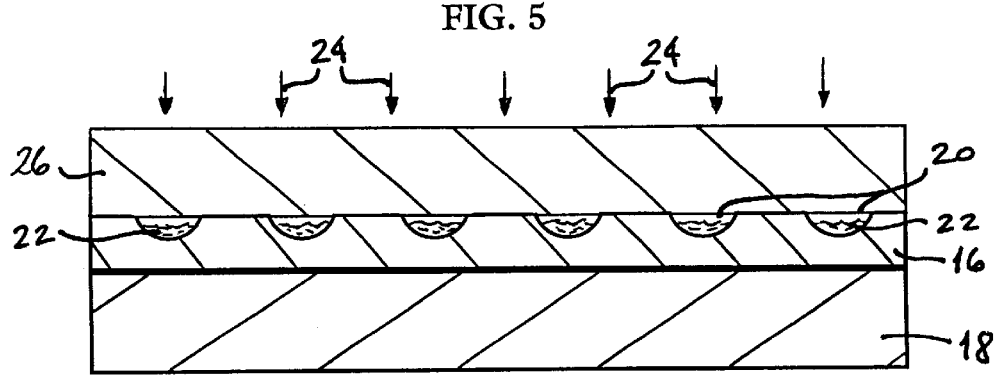

A curable epoxy 22 that exhibits low shrinkage and low hydroxyl group content is dispensed in the cavities 20 (FIG. 4). Sufficient quantities of the epoxy 22 are used to fill the cavities 20. A backing plate 26 is disposed over the elastomeric material 16 to cover the epoxy 22 (FIG. 5). If the curable epoxy 22 is ultraviolet light curable, the backing plate 26 should be transparent to ultraviolet light. Suitable materials for the backing plate 26 may be quartz or BK-7. Ultraviolet light 24 is directed toward the backing plate 26 to cure the epoxy 22 (FIG. 5). The epoxy 22 is cured and formed into micro-lenses 28. The lenses 28 on the backing plate 26 form a replica micro-lens array 30. The replica lens array 30 is peeled from the mold 50 by initially lifting one edge of the backing plate 26. The lenses 28 are then filly cured by heating the replica lens array 30 to about 140° C. for about one hour. To avoid thermal shock, the heat is slowly increased.

The epoxy 22 should be formed of a material which allows for little shrinkage, on the order of about 0.2% volumetric, during cure. Further, the epoxy 22 should be formed of a material that has a refractive index tailored to match the refractive index of the backing plate 26. By matching the refractive indexes of the epoxy 22 and the backing late 26, the reflection losses that would otherwise occur at the interface between the lens 28 and the backing plate 26 are reduced. Finally, the epoxy 22 should be formed of a hydrophobic material.

To attain the above-noted characteristics, the epoxy 22 is preferably formed of a combination of a moldable, curable resin, a curing agent, and particles within a particular size range. The resin must be hydrophobic, solventless and exhibit shrinkage of less than 0.2% upon cure. Further, the uncured resin must be sufficiently fluid for deposition into a mold. Also, the resin must be photocurable (3 mW/cm$^2$ for a few tens of minutes) or be made photocurable with the addition of a suitable photoacid generator. The cured resin should exhibit the properties of (1) a coefficient of thermal expansion that is at most 160 times higher than that of the base plate being used while being sufficiently low that the refractive index of the cured material does not change in the operating temperature of the lens array, (2) a hardness of at least 70 on the D shore scale and preferably greater than 80 on the D shore scale, and (3) stability even at the elevated temperature needed to deposit an anti-reflective coating on the lens, i.e., ability to withstand significant decomposition for one hour at least 120° C. Additionally, the cured resin should have a refractive index close to that of the base plate being used, and the difference in coefficient of refractive index between the cured resin and the base plate should be no more than 1%. Also, the cured resin should have a loss of no more than 1 dB/cm in a light region of interest.

If the epoxy is to be filled with nanoparticles, the uncured resin must have good solubility in a solvent, such as 1-methoxy-2-propanol acetate ("PGMEA") or methylethylketone ("MEK"), which can be used to mix in the commercially available nanoparticle colloidal solution without breaking the suspension. An ideal solvent should not only dissolve the resin but should also be miscible with the solvent used for the colloidal suspension, should be able to maintain the colloidal suspension for at least an hour, and should have sufficient volatility to allow for easy removal under vacuum with moderate heating (up to 100° C.). Finally, if the epoxy is filled with nanoparticles, it should be able to retain a suspension of particles, remain processable prior to exposure long enough for molding (up to at least 20 minutes), and after cure maintain all the above noted requirements of the cured resin.

One suitable epoxy is Polyset PCX28-91B ("Polyset B"), manufactured by Polyset Inc. of Albany, N.Y. To the Polyset B is added nanoparticles 29 (FIG. 6), which tailor the refractive index of the epoxy 22 to the backing plate 26 and inhibit shrinkage during thermal cure.

An anti-reflective coating is necessary to reduce the loss of light due to backscattering, and hence optimizes the light transmitted through the lens. Anti-reflection coatings are generally applied in interleaved layers of high and low refractive index material, typically a quarter wavelength thick. Standard anti-reflective coatings used include silicon dioxide:titanium dioxide, silicon dioxide:zirconium, and a thin silicon nitride layer. Anti-reflection coatings can be deposited at temperature ranges of about 85 to about 125° C. The curing agent should be a photocurable curing agent.

The lenses 28 should have a relatively small absorbance loss, on the order of 0.003 dB/$\mu$m. To minimize the absorption and improve the reliability of the lenses 28, the organic content making up the epoxy 22 should be reduced. One method for reducing the organic content of the epoxy 22 is to mix in particles, or in other words, to load the epoxy 22. For example, by mixing in silica nanoparticles 29 (FIG. 6), the organic content of the epoxy 22 is reduced. Loading the epoxy 22 leads to additional benefits, such as, for example, improving the strength of the cured lenses 28, improving the refractive index match with a quartz backing plate 26, reducing moisture absorption and decreasing the need for a post-exposure thermal cure which in turn reduces the need to match the coefficient of thermal expansion of the resin and the base plate.

The particles should have certain desired properties. The size of the particles should be such that they do not interfere with the refractive index of the cured resin. As a general rule, the upper bound for the size of particles for use in the invention is one-tenth the smallest wavelength of light used in the desired application, and a preferred range of size of particles is one-tenth the upper bound, or one-hundredth the smallest wavelength of light used. Particles that are less than about ten percent of the wavelength transmitted through the lenses will not scatter the light and will not change the refractive index of the cured resin. For example, in telecommunications applications, transmitted optical signals are likely to be in the range of about 0.8 to about two microns. For such applications, the average particle size should be smaller than about 0.08 microns, or about 80 nanometers. Suitable nanoparticles are commercially available from Nissan Chemicals under the product name IPA-ST-S, which is provided as a colloidal suspension in isopropanol with nanoparticles of about eight to eleven nanometers.

Further, the particles should have a size distribution which differs by no more than about twenty percent from the average size. It is also preferred for the particles to be non-agglomerating. If agglomeration does occur, the maximum size of the agglomerated particles should not exceed the upper bound, i.e., one-tenth of the smallest wavelength for the desired application.

For particles larger than ten percent of the transmitted wavelength, the refractive index of the cured resin needs to be matched to the refractive index of the epoxy. Failure to so match may lead to scattered light and light intensity losses. To avoid such losses, it is necessary to choose particles which have the same index of refraction as the epoxy.

The particles are to be selected based upon the objectives of the finished device. For example, nanoparticles are to be selected for lens applications, since smaller particles are more readily suspended and stay suspended in a curable material system. Further, the particles need to be dispersible in uncured resin.

The curable composition, as a whole, also has certain requirements. For example, the relative amount of the particles preferably should be at least 5% and up to 25% by weight of particles in the resin. Further, the particles must be maintained as a colloidal suspension to suppress particle agglomeration which would exceed the upper bound for the particle size. The cured composition should exhibit a hardness of greater than 70 on the D shore scale and preferably greater than 80. For example, tests evaluating the hardness of a composition formed by the invention and composed of Polyset B indicate a hardness of 80 on the D shore scale after UV exposure (3.3 mW/cm² intensity using a broadband oriel 68810 mercury arc lamp) and a thermal cure at 150° C. for one hour. Similar tests on a composition composed of a silica loaded epoxy indicate a hardness of 88 on the D shore scale immediately after UV cure without a post-exposure thermal cure. Removal of the need of a post-exposure thermal cure lessens the importance of matching the coefficient of thermal expansion of the cured resin and the base plate being used.

The backing plate 26 should be free of contamination to ensure good adhesion of the epoxy 22 to the surface of the backing plate. Often, a backing plate 26 may contain organic contamination on its surfaces. Soaking the plate in chromic acid, a powerful oxidant, for about one hour should remove most of the organic contaminants. Additionally, since the cured epoxy 22 is generally hydrophobic, it is necessary to tailor the surface of the backing plate 26 to have comparable surface energy. Also, it is possible for water to adsorb on a surface of the backing plate 26 and prevent proper adhesion of the epoxy to the surface. Removal of surface adsorbed water and adjustment of the surface energy of the backplate can be achieved by subjecting the backing plate 26 to a vapor phase priming technique such as hexamethyldisilazane (HMDS) vapor prime prior to formation of the lenses 28. For a quartz plate, for example, the HMDS deposition was done using a YES oven. Base elements may be processed for ten minutes at 150° C. at a pressure between 20–30 psi.

The surface of the backing plate 26 has silanol (Si—OH) groups that can react with reactive silicon primers to lower the surface tension of the surface. Further, as noted above, the surface of the backing plate 26 includes organic contaminants that must be removed. One way of doing so is to immerse the backing plate 26 for an hour in chromic acid, rinsing with distilled water and drying in a convection oven at about 150° C. for about an hour. In a vapor prime process, such as HMDS vapor prime, the backing plate 26 is placed in a chamber that is pumped down and purged with hot nitrogen to drive out moisture from the surface. Then, the HMDS vapor is diffused at about 150° C. for about five minutes. Importantly, HMDS boils at about 125° C., and it requires several minutes at this temperature to completely react with the silanol groups. Below is an equation (I) which explains the reaction of the surface with the HMDS vapor.

(I)

Another surface treatment effective for promoting better adhesion of epoxy resins utilizes a silane coupling agent, such as 3-glycidoxypropyltrimeth-oxysilane or trimethoxy[2-(7-oxacyclobicyclo[4.1.0]hept-3-yl)ethyl]silane. The silane coupling agent reacts with the silanol group moieties at the quartz, producing a chemically attached layer of material containing unreacted epoxy functionalities. Subsequently, these unreacted epoxy functionalities interact with the epoxy resin when applied to the quartz surface to produce a chemical bond attaching the resin to the quartz. Below is an equation (II) explaining the above-described reaction.

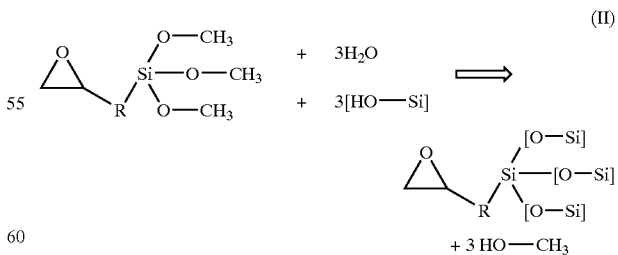

A typical process for treating a quartz surface with silane coupling agents begins by immersing the quartz for an hour in chromic acid, rinsing with distilled water and drying in a convection oven at about 150° C. for about an hour to remove organic contaminants. Next, a two percent (2%) by weight solution of trimethoxy[2-(7-oxacyclobicyclo[4.1.0] hept-3-yl)ethyl]silane is dissolved in 95% ethanol and 5% water. The pH of the solution is adjusted to about 5 by the addition of acetic acid. After allowing the solution to sit for about ten to fifteen minutes, allowing for hydrolysis of the silane reagent, the quartz base element is dipped into the solution, agitated gently and removed after about five minutes. The quartz base element is then rinsed with 95% ethanol, air dried and cured at 110° C. for about ten minutes.

Figure 6:
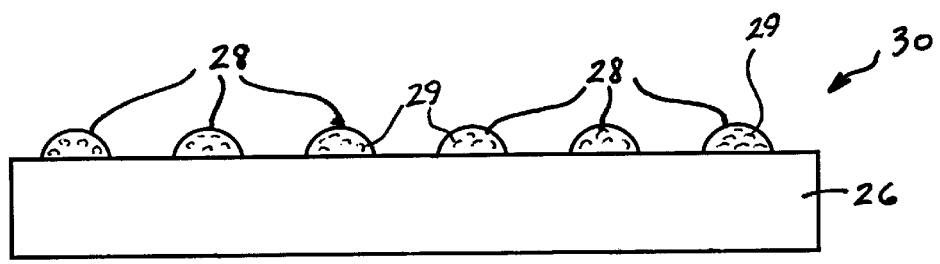
FIG. 6 is a side view illustrating a replica micro-lens array constructed from the master micro-lens array of FIG. 1.
Figure 7:
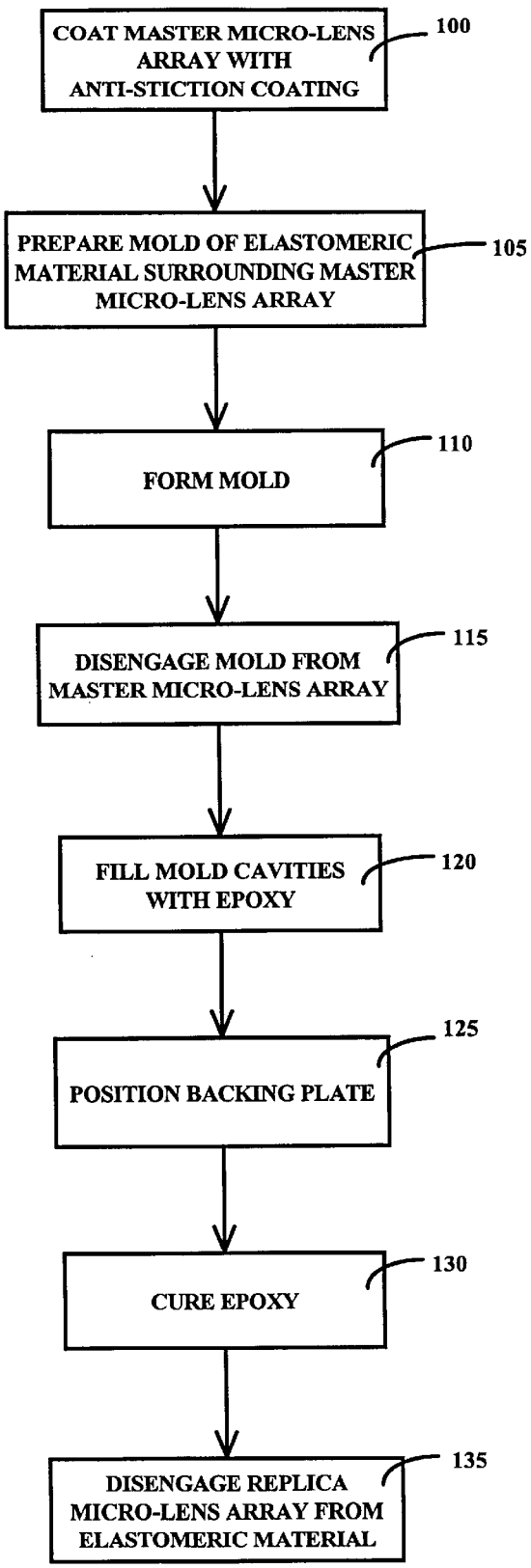
FIG. 7 illustrates steps for forming a replica from the master micro-lens array of FIG. 1.

With reference to FIG. 7, next will be described a method for forming the lens array 30 of FIG. 6. As an initial step 100, the master micro-lens array 10 is coated with an anti-stiction coating 17. The coated micro-lens array 10 is then placed in a replica-making assembly 70. In the cavity 21 surrounding the micro-lens array 10 in the replica-making assembly 70, an elastomeric material 16 is introduced to prepare a mold at step 105.

At step 110, the mold 50 is formed. Forming may be accomplished by placing the replica-making assembly 70 into an enclosure and covering with a dimethylsiloxane monomer and a polymerizing catalyst, such as SYLGARD®, commercially available from Dow Corning Corporation. The enclosure is heated at 65° C. for about five hours. The heat enables a polymerization reaction to take place, forming polydimethylsiloxane ("PDMS"). The PDMS takes the shape of the surface over which it polymerizes. Specifically, the PDMS adheres to the surface of the backplate 18. The PDMS does not adhere to the micro-lens array 10 or the base element 40 upon which the micro-lens array is placed since both are coated with the anti-stiction coating 17. Care should be taken to ensure that no material containing a base (a typically water-soluble compound that in solution has a pH greater than 7) is introduced to the elastomeric material 16 during curing, as such a material may prevent formation of the mold 50.

Usually, upon curing, an elastomeric material exhibits large shrinkage. Such large shrinkage would cause a free standing mold to contract and distort, causing a replica made from such a mold to fail to reproduce the surface of the master accurately. Utilizing a base element 40 forces the elastomeric material 16 to follow the dimension changes of the base element, which are much smaller than that of the elastomeric material 16. The presence of excess elastomeric material surrounding the master micro-lens array 10 allows the distortion of the elastomeric material, already lessened by the presence of the base element 40, to be limited to the edges of the mold 50.

Next, at step 115, the mold 50 is disengaged from the master micro-lens array 10. The mold 50 may be disengaged by peeling the backplate 18 from the master micro-lens array 10. The cavities 20 of the mold 50 are then filled with an epoxy 22 at step 120. To reduce the organic content of the epoxy 22, silica nanoparticles 29 are introduced into the epoxy 22. At step 125, the backing plate 26 is positioned, followed with cure of the epoxy 22 at step 130. If an ultraviolet light curable epoxy is used, a backing plate 26 transparent to ultraviolet light may be disposed over the elastomeric material 16 to cover the epoxy 22. Then, ultraviolet light 24 is directed toward the backing plate 26 to cure the epoxy 22 (FIG. 5). The epoxy 22 is cured and formed into lenses 28. At step 135, the replica lens array, formed by the lenses 28 on the backing plate 26, is disengaged from the mold 50. The replica lens array 30 may be peeled from the mold 50 by initially lifting one edge of the backing plate 26. The lenses 28 are then fully cured by heating the replica lens array 30 at about 140° C. for about one hour. To avoid thermal shock, the heat is slowly increased.

Next will be described in greater detail one methodology for preparing the nanoparticles 29 for use in the lenses 28. In a first approach, a 30% by weight colloidal suspension of 9 nm $SiO_2$ nanoparticles in isopropyl alcohol, such as IPA-ST-S (commercially available from Nissan Chemicals) was mixed with 14.4 ml of 3-glycidyloxypropyl trimethoxysilane (commercially available from Aldrich Chemicals). The colloidal suspension was stirred for two days at room temperature. Residual 3-glycidyloxypropyl trimethoxysilane was then removed by dialysis in isopropyl alcohol. The isopropyl alcohol wash solution was changed daily and after two weeks, the isopropyl alcohol wash solution succeeded in removing the excess reagent. After dialysis and removal, the colloidal suspension was found to contain 19.5% by weight modified nanoparticles, and the nanoparticles had a coverage of 2.2 micromoles/$m^2$ of the trimethoxysilane reagent.

Next, 15 grams of the modified nanoparticles solution (2.93 grams of modified nanoparticles) was mixed with 15 grams of 1-methoxy-2-propanol acetate ("PGMEA"). This provides a clear solution which is compatible with both the modified nanoparticles and miscible with the isopropyl alcohol but has a higher boiling point than isopropyl alcohol. The isopropyl alcohol was then removed by distilling it away at about 80° C., leaving a colloidal suspension of nanoparticles in the higher boiling point solvent (i.e., the PGMEA). The colloidal suspension of nanoparticles, at a pH of about 4 or 5, was neutralized by placing it over anhydrous potassium carbonate ($K_2CO_3$) for about one hour. Although $K_2CO_3$ is described for neutralizing the acidity of the nanoparticles, obviously any suitable base material may be used, provided it can be easily removed by filtration. This neutralization step is included because if the solution remains acidic, premature setting of the photocurable epoxy resin will occur a short time after mixing it with the modified nanoparticle-PGMEA colloidal suspension. After neutralization, the colloidal suspension has about 16% by weight modified $SiO_2$ nanoparticles in PGMEA.

Next, 15.79 grams of the colloidal suspension of modified nanoparticle and PGMEA was blended with 11.05 grams of PCX 28-91B resin (commercially available from Polyset Company, Inc.), on a roller for about thirty minutes, resulting in a clear colloidal suspension. The clear colloidal suspension was put under high vacuum (i.e., less than 1 mm of mercury) to remove the PGMEA. The application of heat at about 40° C. may be included to assist in the complete removal of the PGMEA. The resulting colloidal suspension includes about 19% by weight Polyset B, which can be stored at room temperature for several weeks without degradation and which readily sets after exposure for about twenty minutes with an ILC 4001 light curing unit.

The testing for acidity in the above procedure may be done with any suitable method for detection of pH. One procedure for suitable acidity testing is described below. An amount, 2.312 g, of neutral red, marketed by Aldrich Chemicals, is suspended in 80 mL of ethanol containing 8.8 mL of sodium hydroxide. After stirring, the suspension was filtered to remove any undissolved material. The collected filtrate is diluted with 800 mL of distilled water, stirred, and allowed to crystallize. The formed crystals are filtered and washed with distilled water. After drying, the crystals are dissolved in a heated solution consisting of 80 mL of ethanol diluted with 800 mL of distilled water. After dissolution, the solution is cooled down to 0° C. to promote crystal formation. These crystals are filtered, washed with water, and dried. In this manner, 1.01 g of purified neutral red is obtained. The test solution is prepared by dissolving 6.2 mg of the reagent in 1 L of tetrahydrofurane. For acidity testing, typically five drops of this solution are added to 1 mL of a nanoparticle colloidal suspension. If the solution turns red, the presence of acidity is confirmed.

Apart from PGMEA, other solvents may be used so long as they are compatible with both the colloidal suspension of nanoparticles and the resin. A specific example of the use of an alternate solvent, methylethylketone (MEK), is described below. Fifteen grams of the modified nanoparticles suspension (2.93 grams of modified nanoparticles) is neutralized with $K_2CO_3$, the $K_2CO_3$ is removed, and the suspension is mixed with 15 grams of MEK. Then, 13.5 grams of Polyset B resin is added. After thorough mixing, isopropyl alcohol and the MEK are removed slowly under partial vacuum (Buchi 461 Rotavapor equipped with KNF Model UN726.3 FTP diaphragm pump, 10–30 mm Hg.) using gentle heating (about 30° C.). After most of the solvents have been removed in this fashion, the residual solvent can be removed by application of a higher vacuum (i.e., about 1 mm Hg).

An alternative method using MEK is now described. A 30 wt % suspension of $SiO_2$ nanoparticles in methyl ethyl ketone (Nissan MEK-ST) (1.0 g) is neutralized over anhydrous $K_2CO_3$ and then mixed with Polyset B resin (2.0 g). The clear suspension is stripped of solvent under high vacuum until most of the solvent is removed. Application of gentle heat (about 40° C.) under high vacuum is used to remove any residual solvent. In this manner a 'Polyset' resin is prepared containing 13 weight percent unmodified $SiO_2$ nanoparticles. Failure to treat the $SiO_2$ nanoparticle suspension with $K_2CO_3$ results in premature setting of the suspension when mixed with the Polyset B resin at room temperature after about thirty minutes.

It should be appreciated that other trialkoxysilane reagents containing alkyl epoxy moieties besides 3-glycidyloxypropyl trimethoxysilane, may be used for modifying colloidal $SiO_2$ nanoparticles. Examples of other applicable trialkoxysilane reagents include 3-glycidyloxypropyl triethoxysilane and trimethoxy[2-(7-oxabicyclo[4.1.0]hept-3-yl]ethyl]silane. Formulae (III) and (IV) below illustrate trialkoxysilane/alkyloxirane reagents which are commercially available.

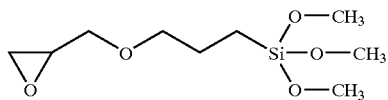

(III)

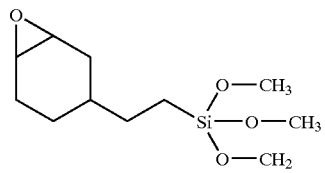

(IV)

Formula (V) below illustrates a generalized chemical formula for those trialkoxysilane epoxies which would be applicable to the invention.

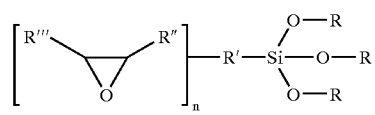

(V)

In Formula (V), R may include an alkyl and a cycloalkyl, R' may include an alkyl, an alkoxyalkyl (for example $CH_2$—O—$CH_2$), a cycloalkyl, and a cycloalkyloxyalkyl (for example, $C_6H_{10}$—O—$CH_2$), R" and R''' may include hydrogen, an alkyl, a cycloalkyl, and an alkyloxyalkyl, and n equals one to three.

Formula (VI) below illustrates a generic chemical formula for a trialkoxysilane reagent that is curable by radicals.

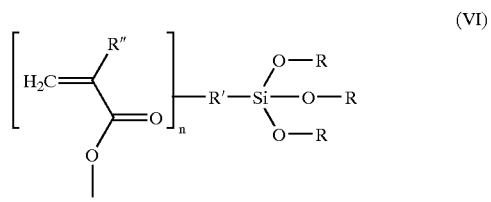

(VI)

In Formula VI, R may include an alkyl and a cycloalkyl, R' may include an alkyl, an alkoxyalkyl (for example $CH_2$—O—$CH_2$), a cycloalkyl, and a cycloalkyloxyalkyl (for example, $C_6H_{10}$—O—$CH_2$), R" may include hydrogen, an alkyl, fluorine, chlorine, and bromine, and n equals one to three.

It should further be appreciated that other additives may be included with the Polyset PCX 28-91B resin to increase silicon content. For example, silsesquioxanes, with or without oxirane flinctionalization, may be used. An amount (100 mg) of glycidoxypropyldimethlsilyloxy) heptacyclopentylpentacyclosiloxane may be dissolved in Polyset PCX 28-91B resin (900 mg). The resulting clear colloidal suspension is highly sensitive to curing. After several days at room temperature, precipitates occur in the resin/silsesquioxane mixture due to hydrolysis of silsesquioxane. Alternatively, 1,3,5,7,9,11,13-heptacyclopentyl-15-glycidylpentacyclo[9,5,1,1$^{3,9}$,1$^{5,15}$1$^{7,13}$]octasiloxane ("POSS") may be used with similar results. Formula (VII) below illustrates several commercially available silsesquioxanes.

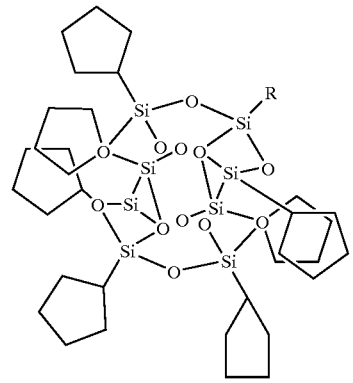

(VII)

In Formula (VII), R may include any of the below noted compounds (VIII):

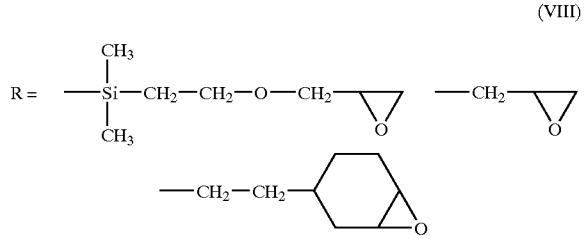

(VIII)

Formulae (IX), (X), (XI) and (XII) below illustrate generic chemical structures for an onium salt type photoacid generator that is applicable to the invention. These photoacid generators would be added to acid-curable epoxy resins which are not already formulated with a photoacid generator to make them suitable for the micromolding process described herein. These photoacid generators could also be added to an acid-curable epoxy resin which does not contain a photoacid generator but does contain nanoparticles of silica or other fillers.

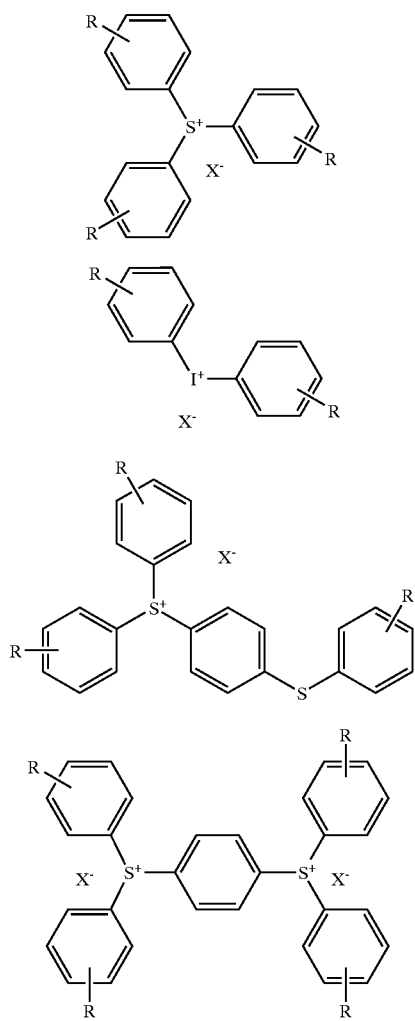

In Formulae (IX), (X), (XI) and (XII), R may include hydrogen, an alkyl and an alkox-y, X may be a non-nucleophilic anion of a strong acid (for example $SbF_6^-$, $AsF_6^-$, $B(C_6F_5)_4^-$, etc.). Typical loadings range from 0.1 to 6 weight percent depending on the sensitivity to photocure desired and the relative solubility of the photoacid generator in the epoxy resin.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A method for forming a micro-lens array, comprising:

applying an anti-stiction coating to a surface of a master micro-lens array including micro-lenses;

providing an elastomeric material over the surface of the master micro-lens array and the micro-lenses;

curing the elastomeric material;

separating the elastomeric material from the master micro-lens array, the elastomeric material having a plurality of cavities defined by the micro-lenses of the master micro-lens array;

filling the cavities with an epoxy;

providing a backing plate to the elastomeric material such that the backing plate covers the cavities;

curing the epoxy; and separating the backing plate from the elastomeric material such that the epoxy adheres to the backing plate.

2. The method of claim 1, wherein the anti-stiction coating comprises an organosilane.

3. The method of claim 2, wherein the anti-stiction coating comprises an organosilane that comprises (tridecafluoro-1,1,2,2-tetrahydrooctyl)-1-trichlorosilane.

4. The method of claim 1, wherein the elastomeric material is a silicone based elastomeric material.

5. The method of claim 4, wherein said introducing step comprises introducing the elastomeric material to a thickness of at least one millimeter.

6. The method of claim 4, wherein said curing the elastomeric material step comprises:

placing the master micro-lens array within a mold cavity;

introducing the elsatomeric material into the mold cavity;

placing the mold cavity within an enclosure;

covering the enclosure with dimethylsiloxane monomer and a polymerizing catalyst; and heating the enclosure.

7. The method of claim 1, wherein the elastomeric material is a low-shrinkage epoxy.

8. The method of claim 7, wherein the epoxy comprises a hydrophobic material.

9. The method of claim 8, wherein the epoxy comprises nanoparticles formed of silica.

* * * * *